(12) United States Patent
Depraete et al.

(10) Patent No.: US 10,054,207 B2
(45) Date of Patent: Aug. 21, 2018

(54) TORQUE CONVERTER FOR A MOTOR VEHICLE

(71) Applicant: VALEO EMBRAYAGES, Amiens (FR)

(72) Inventors: Alexandre Depraete, Bloomfield, MI (US); Xuexian Yin, Troy, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 14/946,136

(22) Filed: Nov. 19, 2015

(65) Prior Publication Data

US 2017/0146105 A1    May 25, 2017

(51) Int. Cl.
| | |
|---|---|
| *F16H 41/24* | (2006.01) |
| *F16H 41/30* | (2006.01) |
| *F16H 45/02* | (2006.01) |

(52) U.S. Cl.
CPC ............ *F16H 45/02* (2013.01); *F16H 41/24* (2013.01); *F16H 41/30* (2013.01); *F16H 2041/246* (2013.01); *F16H 2045/0205* (2013.01); *F16H 2045/0215* (2013.01); *F16H 2045/0226* (2013.01); *F16H 2045/0247* (2013.01); *F16H 2045/0278* (2013.01)

(58) Field of Classification Search
CPC .... F16H 41/24; F16H 2041/246; F16H 41/30; F16H 45/02; F16H 2045/0205; F16H 2045/0215; F16H 2045/0226; F16H 2045/0278
USPC ...................................... 192/3.28–3.3, 110 B
See application file for complete search history.

(56) References Cited

U.S. PATENT DOCUMENTS

| | | | | |
|---|---|---|---|---|
| 4,049,093 A | * | 9/1977 | Vukovich | ............... F16H 45/02 192/3.3 |
| 5,806,644 A | * | 9/1998 | Hinkel | .................... F16D 41/07 188/82.8 |
| 6,006,886 A | * | 12/1999 | Sasse | ...................... F16H 41/28 192/113.5 |
| 7,887,240 B2 | | 2/2011 | Marathe et al. | |

(Continued)

FOREIGN PATENT DOCUMENTS

| | | |
|---|---|---|
| DE | 19533151 A1 | 3/1997 |
| EP | 0731285 A2 | 9/1996 |

(Continued)

OTHER PUBLICATIONS

International Search Report from corresponding international application No. PCT/EP2016/077651 dated Apr. 5, 2017.

*Primary Examiner* — Richard M Lorence
(74) *Attorney, Agent, or Firm* — Berenato & White, LLC

(57) ABSTRACT

A torque converter comprising a torque input element (19), an impeller wheel (3) rotationally coupled to the torque input element (19) and able to hydrokinetically drive a turbine wheel (4), a torque output element (8), clutch means (10, 38) movable between an engaged position in which the torque input element (19) and the torque output element (8) are rotationally coupled through damping means (12, 43, 44, 45), and a disengaged position in which the torque input element (19) and the torque output element (8) are rotationally coupled through the impeller wheel (3) and the turbine wheel (4), with a first bearing (31) being axially mounted between the impeller wheel (3) and the reactor (5), with a second bearing (31') being axially mounted between the reactor (5) and the turbine wheel (4).

13 Claims, 5 Drawing Sheets

(56) References Cited

U.S. PATENT DOCUMENTS

| | | | |
|---|---|---|---|
| 7,938,243 B2 | 5/2011 | Avins et al. | |
| 2012/0292150 A1* | 11/2012 | Tomiyama | F16D 3/14 |
| | | | 192/3.28 |
| 2015/0128582 A1* | 5/2015 | Kawamoto | F16D 41/12 |
| | | | 60/345 |

FOREIGN PATENT DOCUMENTS

| | | |
|---|---|---|
| EP | 0759516 A2 | 2/1997 |
| JP | 7-310816 A | 11/1995 |
| KR | 20030032235 A | 4/2003 |

\* cited by examiner

TORQUE CONVERTER FOR A MOTOR VEHICLE

FIELD OF THE INVENTION

The present invention relates to a torque converter for a motor vehicle.

BACKGROUND OF THE INVENTION

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or the angular shift noted α, of the guiding washers 6 relative to the hub 8, is defined relative to a rest position (α=0) wherein no torque is transmitted through damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant α angular offset of the guiding washers 6 relative to the hub 8 (or vice versa).

Document U.S. Pat. No. 7,938,243 also discloses a torque converter of the prior art. This converter comprises a cover, intended to be rotationally coupled to a crankshaft, an impeller wheel rotationally coupled to the cover and able to hydrokinetically drive a turbine wheel, through a reactor, and a ribbed hub intended to be coupled to a transmission input shaft. The torque converter further comprises clutch means movable between an engaged position in which the cover and the hub are rotationally coupled through damping means, and a disengaged position in which the cover and the hub are rotationally coupled through the impeller wheel and the turbine wheel. A first bearing is mounted between the impeller wheel and the reactor. A second bearing is mounted between the reactor and the turbine wheel. Such bearings are needle thrust bearings.

Such bearings are relatively bulky in the axial direction and are very expensive.

SUMMARY OF THE INVENTION

The invention more particularly aims at providing a simple, efficient and cost-effective solution to this problem.

For this purpose, it provides for a torque converter for a motor vehicle, comprising a torque input element, intended to be non-rotatably coupled to a crankshaft, an impeller wheel non-rotatably coupled to the torque input element and able to hydrokinetically drive a turbine wheel through a reactor, a torque output element, intended to be coupled to a transmission input shaft, clutch means movable between an engaged position in which the torque input element and the torque output element are rotationally coupled, and a disengaged position in which the torque input element and the torque output element are rotationally coupled through the impeller wheel and the turbine wheel, with a first bearing being axially mounted between the impeller wheel and the reactor, with a second bearing being axially mounted between the reactor and the turbine wheel, characterized in that the first bearing and/or the second bearing comprises at least a friction ring.

The words "axial" or "radial" are defined with respect to the axis of rotation of the turbine wheel, which is more generally the axis of the torque converter.

Using a friction ring makes it possible to reduce the production cost as well as the axial overall dimensions of such a torque converter.

The damping means may be so designed as to act against the rotation and make it possible to dampen and filter the engine rotation acyclism.

The first bearing comprises a first friction ring rotationally coupled to the reactor, or to the impeller wheel respectively, with the impeller wheel or the reactor respectively being adapted to rest and rub on the first friction ring.

The second bearing comprises a second friction ring rotationally coupled to the turbine wheel or to the reactor respectively, with the reactor or respectively the turbine wheel being adapted to rest and rub on the second friction ring.

The friction surfaces of the first and second friction rings are thus controlled.

In this case, the first friction ring and/or the second friction ring comprises a coupling pad engaged in a recess having a shape which matches that of the impeller wheel, the turbine wheel or the reactor so as to achieve a rotational coupling.

The friction ring comprises at least one first oil circulation channel which extends along the axis of the matching ring, and which opens into a lubricated space of the torque converter.

The first channel thus makes it possible to lubricate the friction ring, more particularly the matching friction surface thereof.

The first oil circulation channel may go through the coupling pad. The pad thus provides a rotational coupling function and a lubrication function.

The friction ring comprises at least one second oil circulation channel which extends radially and opens at a radial friction surface of said friction ring, with the impeller wheel, the turbine wheel or the reactor being adapted to rest on and pivot relative to said radial friction surface.

The second oil circulation channel thus makes it possible to lubricate the matching friction surface of the friction ring.

Besides, the reactor may comprise an annular backing plate attached to a hub of the reactor and having a radial surface resting on the friction surface of the first friction ring or of the second friction ring.

Such a plate makes it possible to define a radial friction surface intended to rest on the friction surface of the matching friction ring.

The first friction ring and the second friction ring may have identical structures, so as to have even lower production costs and to reduce mounting errors in such a torque converter.

The friction ring may be made of a synthetic material, for instance a thermoplastic.

The torque converter according to the invention may also comprise one or more following characteristics:

- the torque input element and the torque output element are rotationally coupled through damping means,
- the torque output element comprises a hub comprising an internal rib adapted to cooperate with an external rib of a transmission input shaft.
- the damping means comprise an annular wheel disc attached or rotationally coupled to the torque output element, at least one guiding washer, for instance two guiding washers, with at least one first elastic member being mounted between the guiding washer and the annular wheel disc, with at least one second elastic member being mounted between the clutch means and the guiding washer,
- the first elastic member is a coil compression spring,
- the second elastic member is a coil compression spring,
- the damping means comprise two guiding washers positioned axially on either side of the annular wheel disc.
- the torque converter comprises an inertial vibration dampening mass consisting of an inertial mass connected to the annular wheel disc by at least one elastic member, such as, for instance a coil compression spring.
- the clutch means comprise a piston mounted to move between the engaged and disengaged positions,
- the piston is mounted, at its radially internal periphery, about the hub of the torque output element,
- the radially internal periphery of the piston comprises a cylindrical part mounted to move in translation and in rotation along the axis of said cylindrical part, about a cylindrical part of the hub of the torque output element,
- the torque input element comprises a bell-shaped cover which at least partly accommodates the impeller wheel, the turbine wheel, the reactor, the clutch means and/or the damping means, and/or the inertial vibration dampening mass,
- the cover comprises two parts assembled together, for instance by welding.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
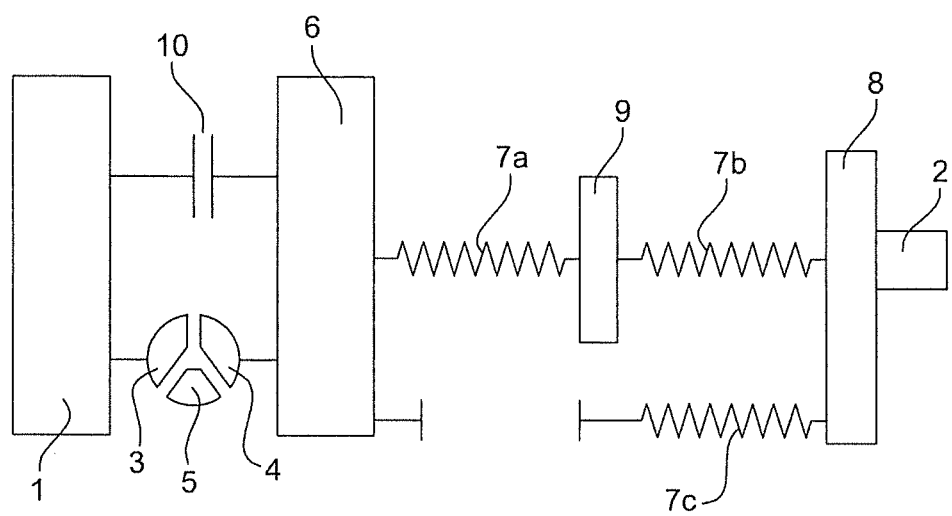
FIG. 1 is a schematic representation of a torque converter of the prior art.
Figure 2:
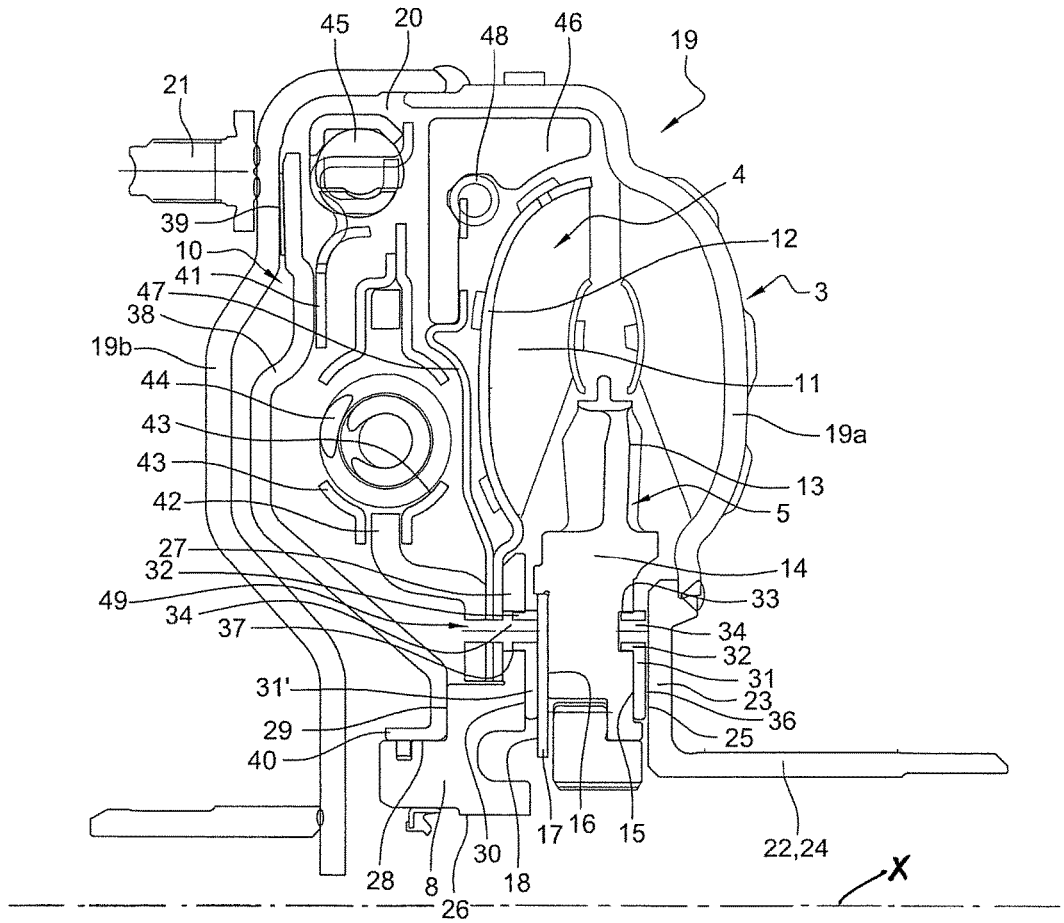
FIG. 2 is a half-view along an axial plane, of a torque converter according to one embodiment of the invention.
Figure 3:
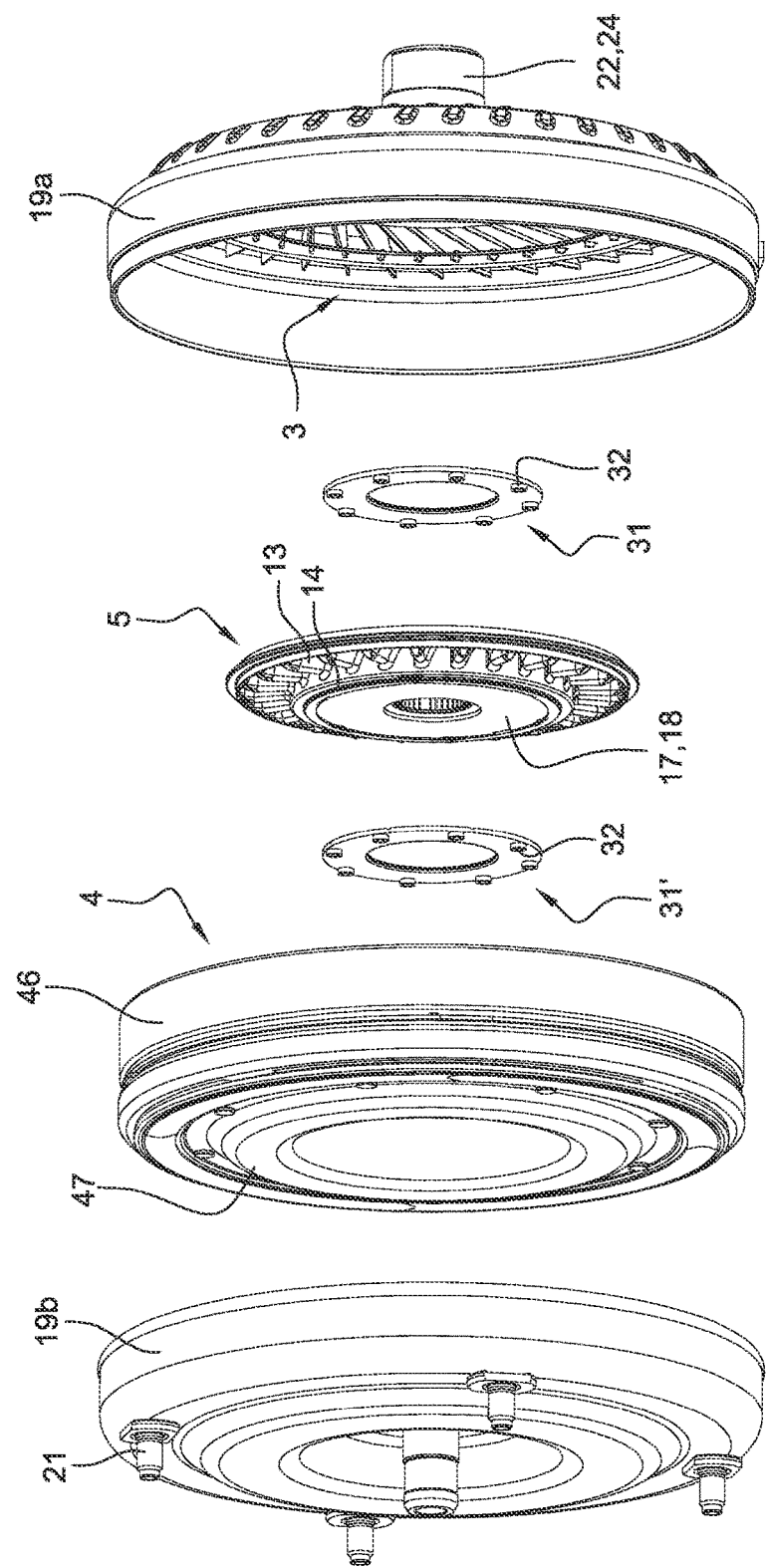
FIGS. 3 and 4 are perspective exploded views of the torque converter according to the invention.
Figure 4:
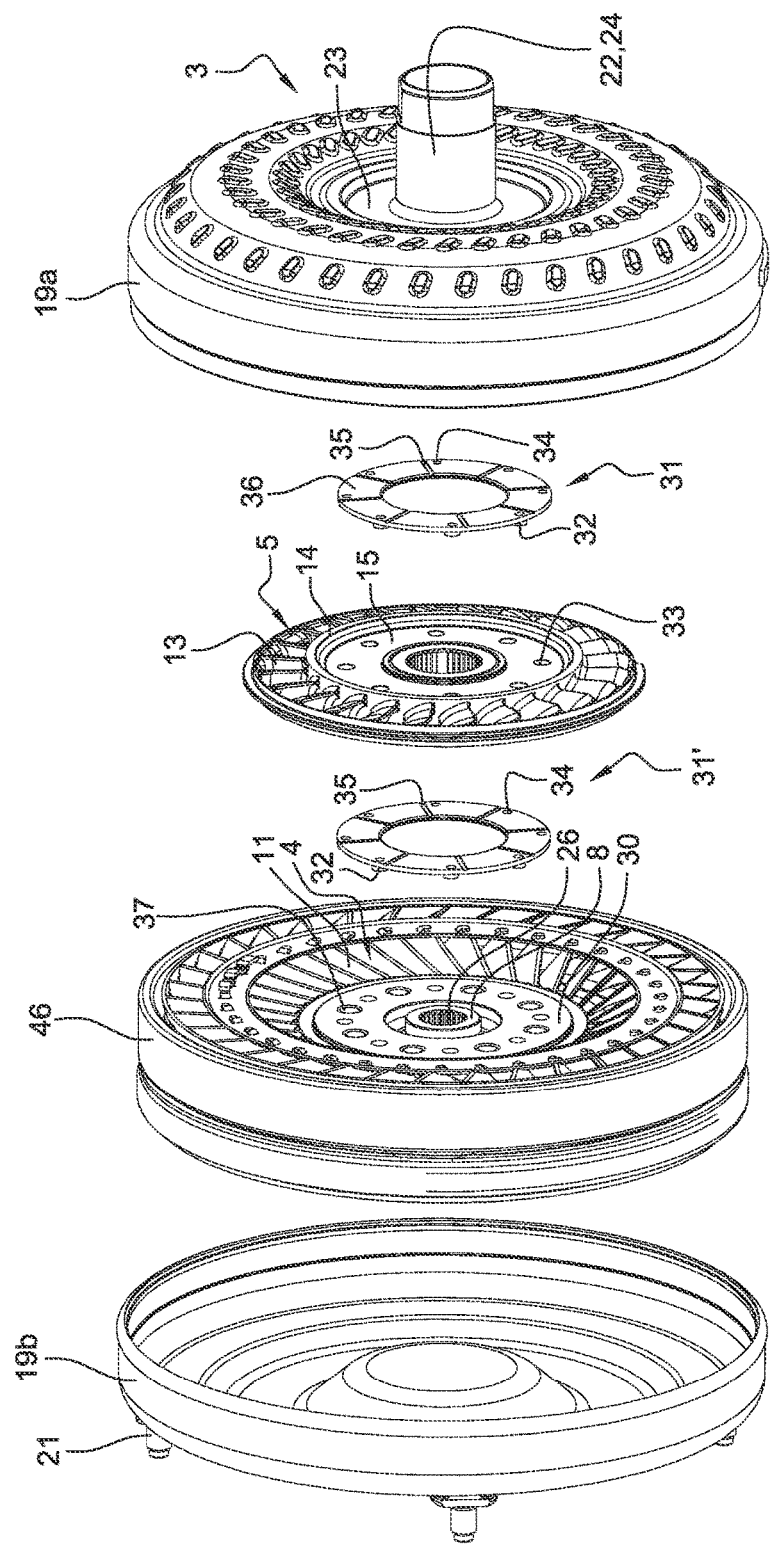
Figure 5:
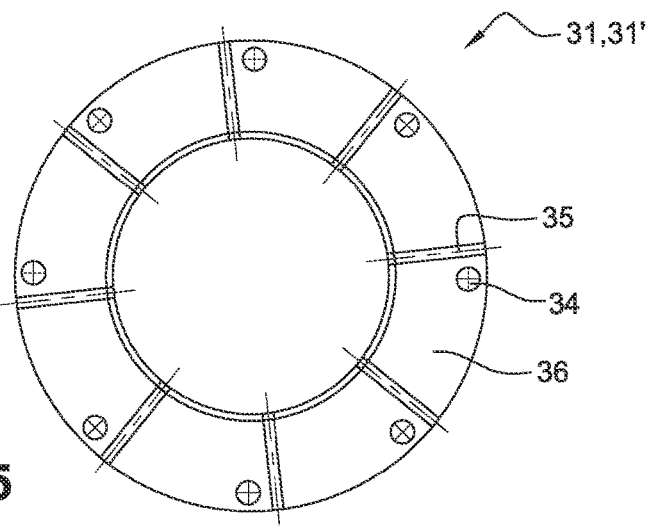
FIG. 5 is a front view, seen from the back side, of a friction ring of the torque converter according to the invention.
Figure 6:
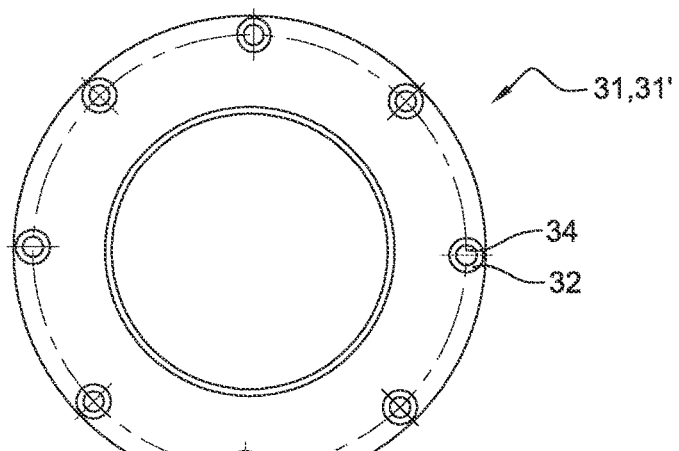
FIG. 6 is a front view of a friction ring of the torque converter according to the invention.
Figure 7:
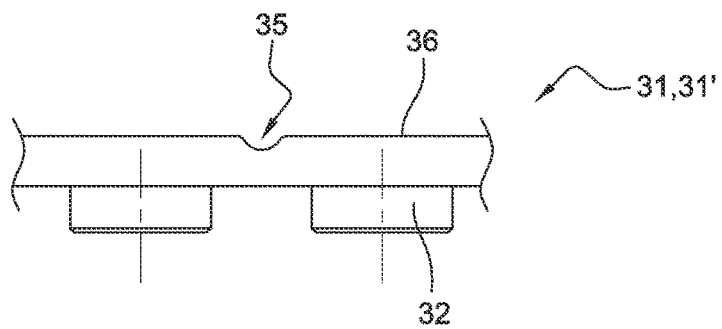
FIG. 7 is a side view of a detail of the friction ring.

FIGS. 2 to 7 illustrate a hydrodynamic torque converter according to one embodiment of the invention. Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

The torque converter conventionally comprises an impeller bladed wheel 3, able to hydrokinetically drive a turbine bladed wheel 4 through a reactor 5.

The turbine wheel 4 more particularly comprises vanes 11 mounted on an annular support 12.

The reactor 5 comprises blades 13 which extend radially outwards from a hub 14 positioned radially inside of the blades 13. The hub 14 of the reactor 5 more particularly comprises a front radial surface 15 and a back radial surface 16.

An annular backing plate 17 which extends in the radial plane is attached to the hub 14 of the reactor 5 and rests on the back radial face 16 of said hub 14. Said plate 17 forms a radial friction surface 18 turned backwards.

The impeller wheel 3 is fastened to a cover consisting of two belt-shaped parts 19a, 19b assembled together by welding and defining an internal volume 20 accommodating the impeller wheel 3, the turbine wheel 4 and the reactor 5. Said cover 19a, 19b, also more generally referred to as the cover 19, comprises fastening means 21 making it possible to non-rotatably couple said cover 19 with the crankshaft 1.

The part 19a of the cover is attached, for instance by welding, to an impeller hub 22. The impeller hub 22 comprises a radial annular back part 23, the radially internal periphery of which is extended forwards by a tubular cylindrical part 24.

The radial part 23 of the impeller hub 22 comprises a back radial surface 25 turned towards, and located opposite, the front radial surface 15 of the hub 14 of the reactor 5.

The turbine wheel 4 of the torque converter further comprises a turbine hub 8, also called the X axis turbine hub 8, a radially internal periphery of which is ribbed and accommodated in the internal volume 20 of the cover 19. The turbine hub 8 comprises an annular rim 27 radially extending outwards and positioned at the front end thereof.

The turbine hub further comprises a cylindrical part 28 positioned at the back end thereof, with said cylindrical part 28 defining a radial shoulder, with the radial surface 29 of said shoulder facing backwards.

The front end of the hub forms a radial surface 30 turned towards, and located opposite, the back radial surface 16 of the hub 14 of the reactor 5.

A first friction ring 31 is axially inserted between the front radial face 15 of the hub 14 of the reactor 5 and the back radial face 25 of the impeller hub 22. The first friction ring 31 comprises cylindrical coupling pads 32 which extend axially backwards toward the hub 14 of the reactor 5 and are regularly distributed over the circumference of the first friction ring 31. The coupling pads 32 are for instance eight in number. The coupling pads 32 are engaged in complementary recesses 33 in the hub 14 of the reactor 5 so as to non-rotatably couple the first friction ring 31 and of the reactor 5. Each of the coupling pads 32 of the first friction ring 31 has a shape which matches (i.e., is complementary to) one of the recesses 33 in the hub 14 of the reactor 5. The friction ring 31 further comprises first oil circulation channels 34 which are radially spaced from and extend parallel to the X axis of the matching ring 31, and which open into a lubricated space of the torque converter. Each first channel 34 goes through the ring 31 at one of the coupling pads 32.

The first friction ring 31 further comprises second channels 35 which extend radially. The second channels 35 extend from a radially internal rim to a radially external rim of the first friction ring 31 and are regularly distributed on the whole circumference of the first friction ring 31. Each second channel 35 is additionally formed by a groove provided on a friction surface 36 of the first friction ring 31, i.e. a front facing face. Each second channel 35 has a circular or rounded section.

A second friction ring 31' is axially inserted between the back radial face 18 of the backing plate 17 and the front radial face 30 of the turbine hub 8.

The second friction ring 31' has the same structure as the first friction ring 31. The coupling pads 32 of the second friction ring 31' are engaged in complementary recesses 37 in the turbine hub 8 so as to non-rotatably couple the second friction ring 31' and the turbine hub 8. Each of the coupling pads 32 of the second friction ring 31' has a shape which matches (i.e., is complementary to) one of the recesses 37 in the turbine hub 8. Thus, the the first bearing (31) and the second bearing (31') are axially spaced and separated from one another by the reactor (5). The recesses 37 more particularly go through the annular rim 27 of the turbine hub 8. The first friction ring 31 and the second friction ring 31' are rotatable relative to one another as the turbine wheel 4 and the reactor 5 are rotatable relative to one another.

The first friction ring 31 and/or the second friction ring 31' are made of a synthetic material, for instance a thermoplastic.

The torque converter further comprises clutch device 10 comprising an annular piston 38 which extends radially and is accommodated in the inner space 20 of the cover 19, the radially external periphery of which comprises a resting area equipped with clutch lining 39 and adapted to rest on the part 19b of the cover 19 in an engaged position, so as to provide a rotational coupling of the cover 19 and of the piston 38.

The radially internal periphery of the piston 38 comprises a cylindrical rim 40 which is so mounted as to be free to rotate and to move in translation along the X axis about the cylindrical part 28 of the turbine hub 8.

The piston 38 can thus move in translation between an engaged position in which the piston 38 and the cover 19 are rotationally coupled and a disengaged position in which the piston 38 is positioned away from the cover 19 so that the piston 38 is not directly rotationally coupled to the cover 19.

The motion of the piston 38 is controlled by pressure chambers positioned on either side of the piston 38. Besides, the motion of the piston 38 in the disengaged position may be limited by the radially internal periphery of the piston 38 resting on the radial surface 29 of the shoulder of the turbine hub 8.

A linking member 41 is fastened to the piston, for instance by welding or by rivets, in a zone positioned radially inside the clutch lining 39. The linking member 41 and the cover 38 may of course consist of one single part, without the operation of the torque converter being affected.

It should be noted that, in one not shown embodiment, the piston 38 can be so mounted as to pivot directly about the transmission input shaft 2.

The clutch device 10 is configured to transmit a torque from the crankshaft 1 to the transmission input shaft 2, in a determined operation phase, without any action by the hydrokinetic coupling means consisting of the impeller wheel 3, the turbine wheel 4 and the reactor 5.

The torque converter further comprises damping device comprising an annular wheel disc 42 extending radially, the radially inner periphery of which is fixed to the annular rim 27 of the turbine hub 8, for instance by riveting or welding. The damping device comprises two guiding washers 43 extending radially, and positioned axially on either side of the annular wheel disc 42. First elastic members 44, such as, for instance coil compression springs, are mounted between the annular wheel disc 42 and the guiding washers 43.

Second elastic members 45, such as, for instance coil compression springs, are mounted between the guiding washers 43 and the linking member 41 attached to the piston 38.

The first and second elastic members 44, 45 are so designed as to act against the rotation of the piston 38 relative to the turbine hub 8.

Such damping device is configured to damp and filter the engine rotation acyclism.

The torque converter further comprises an annular inertia mass 46 connected to the radially internal periphery of the annular wheel disc 42 through an annular steel sheet 47 and elastic members 48 mounted between the inertia mass 46 and the annular steel sheet 47, so as to form an inertial vibration dampening mass. The elastic members 48 are for instance coil compression springs. Such an inertial vibration dampening mass is intended to filter vibrations at at least one determined frequency, more specifically an engine resonance frequency.

The radially internal periphery of the steel sheet 47 of the inertial vibration dampening mass and of the support 12 of the turbine wheel 4 are axially mounted between the annular wheel disc 42 and the rim 27 of the turbine hub 8. The steel sheet 47, the support 12, the annular wheel disc 42 and the rim 27 of the turbine hub 8 can be attached together, for instance using rivets.

Holes 49 are provided in the annular wheel disc 42, the steel sheet 47 and the support 12, opposite the holes 37 of the annular rim 27 of the turbine hub 8 and the first oil circulation channels 34 of the second friction ring 31'.

In operation, in the disengaged position of the piston 38, the torque from the crankshaft 1 is transmitted to the cover 19 through the fastening means 21. In the disengaged position of the piston 38, the torque goes through the hydrokinetic coupling means, i.e. the impeller wheel 3 and then the turbine wheel 4 fixed to the hub 8. The torque is then transmitted to the transmission input shaft 2 coupled to the turbine hub 8 through the internal ribs 26 of the hub 8.

In the engaged position of the piston 38, the torque from the cover 19 is transmitted to the turbine hub 8 through, in sequence, the piston 38, the linking member 41, the elastic members 45, the guiding washers 43, the elastic members 44 and the annular wheel disc 42.

In operation too, the turbine hub 8 and the impeller hub 22 pivot relative to the reactor 5 hub 14. The friction rings 31, 31' act as bearings, the friction surfaces 36 of which are lubricated, with lubrication being facilitated by the presence of the first and second oil circulation channels 34, 35.

Using such friction rings 31, 31' makes it possible to reduce the production cost as well as the axial overall dimensions of the torque converter.

The invention claimed is:
1. A torque converter for a motor vehicle, comprising:
a torque input element (19) non-rotatably coupled to a crankshaft (1);
an impeller wheel (3) non-rotatably coupled to the torque input element (19) and configured to hydrokinetically drive a turbine wheel (4) through a reactor (5), a torque output element (8), intended to be coupled to a transmission input shaft (2), clutch device (10, 38) movable between an engaged position in which the torque input element (19) and the torque output element (8) are rotationally coupled, and a disengaged position in which the torque input element (19) and the torque output element (8) are rotationally coupled through the impeller wheel (3) and the turbine wheel (4);

a first bearing (31) axially mounted between the impeller wheel (3) and the reactor (5); and a second bearing (31') axially mounted between the reactor (5) and the turbine wheel (4), at least one of the first bearing and the second bearing comprising a friction ring (31, 31'), the first bearing (31) and the second bearing (31') being axially separated from one another by the reactor (5);

the reactor (5) comprising a hub (14) and blades 13 extending radially outwardly from the hub (14), the hub (14) having a first radial surface (15) and an axially opposite second radial surface (16);

the friction ring (31, 31') comprising an axially extending coupling pad (32) disposed in a recess (33, 37) in one of the impeller wheel (3), the turbine wheel (4) and the hub (14) of the reactor (5);

the coupling pad (32) being complementary to the recess (33, 37) so as to non-rotatably couple the friction ring (31, 31') to one of the impeller wheel (3), the turbine wheel (4) and the hub (14) of the reactor (5).

2. The torque converter according to claim 1, wherein the first bearing comprises a first friction ring (31) non-rotatably coupled to one of the reactor (5) and the impeller wheel (3), and wherein another one of the reactor (5) and the impeller wheel (3) is configured to rest and rub on the first bearing friction ring (31).

3. The torque converter according to claim 2, wherein the second bearing comprises a second friction ring (31') non-rotatably coupled to one of the turbine wheel (4) and the reactor (5), and wherein another one of the turbine wheel (4) and the reactor (5) is configured to rest and rub on the second friction ring (31').

4. The torque converter according to claim 3, wherein the first friction ring (31) and the second friction ring (31') have identical structures.

5. The torque converter according to claim 3, wherein one of the first friction ring (31) and the second friction ring (31') comprises the coupling pad (32) engaged in the recess (33, 37) in one of the impeller wheel (3), the turbine wheel (4) and the hub (14) of the reactor (5), and wherein the coupling pad (32) is complementary to the recess (33, 37) so as to non-rotatably couple the first friction ring (31) to one of the impeller wheel (3) and the hub (14) of the reactor (5) or to non-rotatably couple the second friction ring (31') to one of the turbine wheel (4) and the hub (14) of the reactor (5).

6. The torque converter according to claim 3, wherein at least one of the first friction ring (31) and the second friction ring (31') comprises at least one first oil circulation channel (34) which is radially spaced from and extends parallel to an axis (X) of the torque converter, and which opens into a lubricated space of the torque converter.

7. The torque converter according to claim 3, wherein the first friction ring (31) comprises a first axially extending coupling pad (32) engaged in the recess (33) in the hub (14) of the reactor (5), wherein the first coupling pad (32) is complementary to the recess (33) to non-rotatably couple the first friction ring (31) to the hub (14) of the reactor (5), wherein the second friction ring (31') comprises a second axially extending coupling pad (32) engaged in a recess (37) in the turbine wheel (4), and wherein the second coupling pad (32) is complementary to the recess (37) to non-rotatably couple the second friction ring (31') to the turbine wheel (4).

8. The torque converter according to claim 2, wherein the friction ring (31, 31') comprises at least one first oil circulation channel (34) which is radially spaced from and extends parallel to an axis (X) of the friction ring (31, 31'), and which opens into a lubricated space of the torque converter.

9. The torque converter according to claim 1, wherein the friction ring (31, 31') comprises at least one first oil circulation channel (34) which is radially spaced from and extends parallel to an axis (X) of the torque converter, and which opens into a lubricated space of the torque converter.

10. The torque converter according to claim 9, wherein the at least one first oil circulation channel (34) extends axially through the coupling pad (32).

11. The torque converter according to claim 1, wherein the friction ring (31, 31') comprises at least one second oil circulation channel (35) which extends radially and opens at a radial friction surface (36) of the friction ring (31, 31'), with the impeller wheel (3), the turbine wheel (4) or the reactor (5) being adapted to rest on and pivot relative to the radial friction surface (36).

12. The torque converter according to claim 11, wherein the reactor (5) comprises an annular backing plate (17) attached to a hub (14) of the reactor (5) and having a radial surface (18) resting on the friction surface (36) of the friction ring (31, 31').

13. The torque converter according to claim 1, wherein the friction ring (31, 31') is made of a synthetic material.

* * * * *